United States Patent [19]

Wright et al.

[11] 4,333,969

[45] Jun. 8, 1982

[54] PROCESS FOR PRODUCING STYRENIC POLYMER BEADS OF PREFERRED BEAD SIZE

[75] Inventors: Harold A. Wright, Murrysville; Alvin R. Ingram, West Chester, both of Pa.

[73] Assignee: Atlantic Richfield Company, Los Angeles, Calif.

[21] Appl. No.: 219,453

[22] Filed: Dec. 23, 1980

[51] Int. Cl.$^3$ .................. B05D 7/00; C08F 112/08
[52] U.S. Cl. .................. 427/222; 428/407; 525/258; 526/209; 526/293; 526/346; 526/347; 526/347.1
[58] Field of Search .............. 526/209, 293, 346, 347, 526/347.1; 525/258; 427/222; 428/407

[56] References Cited

U.S. PATENT DOCUMENTS

| | | | |
|---|---|---|---|
| 3,442,880 | 5/1969 | White | 526/346 |
| 3,442,881 | 5/1969 | Jahn et al. | 526/346 |
| 3,922,255 | 11/1975 | Koestler et al. | 526/346 |
| 4,017,670 | 4/1977 | Spicuzza et al. | 526/346 |
| 4,170,699 | 10/1979 | Wright | 526/346 |
| 4,174,425 | 11/1979 | Saito et al. | 526/209 |

FOREIGN PATENT DOCUMENTS 1416405  12/1975  United Kingdom .

*Primary Examiner*—Harry Wong, Jr.
*Attorney, Agent, or Firm*—Lewis J. Young

[57] ABSTRACT

Styrenic polymer beads of a preferred size are produced from styrenic polymer beads of a smaller size by forming an aqueous suspension of the styrenic polymer beads and adding thereto, under polymerization conditions, an aqueous emulsion formed by admixing styrenic monomer and a catalyst therefor with water containing a nonionic surfactant that is an ethylene oxide condensate of an alkylphenol, which contains at least fifty moles of ethylene oxide per mole of alkylphenol. The beads of preferred size are formed without formation of fine styrenic polymer particles and without significant amounts of clusters of beads.

11 Claims, No Drawings

PROCESS FOR PRODUCING STYRENIC POLYMER BEADS OF PREFERRED BEAD SIZE

BACKGROUND OF THE INVENTION

The production of styrenic polymer beads by an aqueous suspension process is a well known and commercial practice. Such polymerization may be effected by the suspension polymerization of a styrenic monomer in an aqueous medium with an oil-soluble polymerization catalyst, using a suspending system comprised of a finely divided difficultly water-soluble inorganic phosphate, such as tricalcium phosphate, in conjunction with an anionic surface-active agent, such as sodium dodecylbenzene sulfonate, as a modifier. Such suspension polymerization systems are described, for example, in Grim patent, U.S. Pat. No. 2,673,194.

In the use of known suspension polymerization systems, such as those taught in the Grim patent, however, styrenic polymer beads are produced which vary in size. The range of bead size can vary widely, dependent upon the type and intensity of mixing and the particular suspension system selected. Although the average bead size can be controlled, to an extent, by adjustment of the involved variables, the bead size distribution will remain broader than that required, for example, by the expandable polystyrene bead foam industry.

Attempts have been made to utilize off-size beads by dissolving them in styrenic monomer and subjecting the solution to a suspension polymerization with the addition of an oil-soluble catalyst; by suspending small beads in water and effecting suspension polymerization, with a catalyst, after gradual addition of styrenic monomer to the suspension system; or by suspending small polystyrene beads in water and adding styrene monomer in the presence of a catalyst therefor plus a polymerization retarder, as described in British Pat. No. 1,416,405. As described in said British patent, the use of a polymerization retarder is suggested so as to form large beads from the small styrene beads without the production of significant amounts of fine powdery polymeric particles. Even with the practice of the process described in said British patent, however, powdery polystyrene particles are formed in an amount of about 0.3 or more percent based upon the weight of the polymer beads produced.

An object of the present invention is to provide a process for producing styrenic polymer beads of a preferred bead size from styrenic polymer beads of a smaller size.

Another object of the present invention is to produce styrenic polymer beads of a preferred size from styrenic polymer beads of a smaller size while using conventional catalyst systems for styrene polymerization.

A further object of the present invention is to provide a process for producing styrenic polymer beads of a preferred size from styrenic polymer beads of smaller size while preventing the formation of any significant amount of fine powdery polymer particles.

An additional object of the present invention is to form styrenic coatings on styrenic polymer beads over a broad range of coating sizes and bead sizes.

A further additional object of the present invention is to produce styrenic polymer beads having a narrow bead size distribution by the formation of styrenic coatings thereon.

SUMMARY OF THE INVENTION

A process for forming styrenic polymer beads having a preferred bead diameter from styrenic polymer beads having a smaller diameter, without production of any significant amount of powdery fine styrenic polymer particles, comprises forming a suspension of the small styrenic polymer beads in an aqueous medium with the aid of a finely divided, difficultly water-soluble inorganic phosphate suspending agent and a modifier therefor; forming an emulsion of styrenic monomer containing a free radical-producing catalyst in an aqueous medium, using at least 0.1%, water basis, of a nonionic surfactant that is an ethylene oxide condensate of an alkylphenol and which contains at least fifty moles of ethylene oxide per mole of alkylphenol, such as a polyoxyethylene ether of nonylphenol containing fifty to one hundred moles of ethylene oxide per mole of nonylphenol; and adding the styrenic monomer-catalyst aqueous emulsion to the styrenic polymer bead suspension and polymerizing the styrenic monomer about the styrenic beads.

DETAILED DESCRIPTION

The present process enables the production of styrenic polymer beads of a preferred size from smaller sized styrenic polymer beads. The term "styrenic" as used herein is intended to include styrene, alpha-methylstyrene, para-methylstyrene, para-t-butylstyrene, monochlorostyrene and dichlorostyrene, as well as mixtures thereof, when used in conjunction with styrenic polymer beads or styrenic monomer. The formation of such styrenic polymer beads is according to known processes and the present invention is directed to a process for forming larger beads from small size beads formed during suspension polymerization.

The styrenic polymer beads of a small size are dispersed in water containing a finely divided, difficultly water-soluble inorganic phosphate suspending agent such as those described in Grim U.S. Pat. No. 2,673,194, and include tricalcium phosphate, hydroxyapatite, magnesium phosphate, and the like. In addition to the finely divided difficultly water-soluble inorganic phosphate suspending agent, there is added, as is conventional, a modifier therefor also as described in the Grim patent, such as sodium dodecylbenzene sulfonate.

To the aqueous suspension of the small styrenic polymer beads there is added an aqueous emulsion of styrenic monomer, containing a catalyst therefor, and a nonionic surfactant of particular components. The catalyst that forms a part of the emulsion comprises a free-radical initiating catalyst which is soluble in the styrenic monomer, such as the known peroxides, benzoyl peroxide and t-butyl perbenzoate, in conventional amounts.

The styrenic monomer and monomer-soluble catalyst are emulsified in an aqueous medium by the use of specific nonionic surfactants. The nonionic surfactants usable in the present process are ethylene oxide condensates of an octyl or nonylphenol, and the nonionic surfactant must contain at least 50 moles of ethylene oxide per mole of said alkylphenol. Particular useful nonionic surfactants include a polyoxyethylene (50) ether of nonylphenol sold under the name of Igepal CO-970 and a polyoxyethylene (100) ether of nonylphenol sold under the name of Igepal CO-990. Use of other surfactants, either nonionic or other, or even the use of polyoxyethylene nonylphenol surfactants having less than about fifty moles of ethylene oxide per mole of nonylphenol have been found to result in complete or partial agglomeration of the beads as well as the production of a significant amount of powdery fine polymeric material.

The particular surfactants are added to the catalyst-styrene-water mixture in an amount of 0.1 to 1.0 weight percent, based upon the amount of water in the emulsion to be formed, with about 0.5 percent by weight, preferred.

The styrenic monomer aqueous emulsion containing a free radical catalyst and the specified nonionic surfactant may be formed as an emulsion in a single vessel and added therefrom to the aqueous suspension of styrenic polymer beads, or a catalyst-containing styrenic monomer stream may be continuously admixed with an aqueous stream containing the nonionic surfactant, and the fresh emulsion thus formed continuously fed to the aqueous suspension of styrenic polymer beads.

The styrenic monomer-catalyst aqueous emulsion containing the nonionic surfactant is added to the aqueous suspension of styrenic polymer beads, over a period of time, such as a four to five hour period, with the suspension maintained at an elevated temperature, such as about 90° C., with stirring. The suspension is then further heated, with stirring, at about 90° C. for a sufficient time period, such as about three to six hours, so as to effect polymerization of the styrenic monomer about the beads. The time of addition, temperature, and time of additional heating to effect polymerization may be varied, dependent upon the amount and type of styrenic monomer used and the thickness and hardness of the coating desired about the styrenic beads.

Using the present process, styrenic polymer beads of a specific type may be grown from a designated smaller size of diameter ($d_o$) to a predictable larger size of diameter ($d_f$) as a function of the amounts of styrenic polymer coating (10–90 percent) applied, or alternatively as a function of the percent (90–10 percent) of smaller seed beads employed. Ideal growth is predicted theoretically by the following mathematical equation:

$$d_f = d_o \sqrt[3]{100/\% \text{ seed}}$$

where $\% \text{ seed} = \dfrac{\text{Weight of seed}}{\text{Weight od product}} \times 100$ Use of the above equation is illustrated in the following Table I.

TABLE I

Growth of Beads in Seeded Suspension Polymerization

| | Original Bead | | Final Bead | | |
|---|---|---|---|---|---|
| Seed % | Diam, $d_o$(mm) | Vol, $V_o$(mm³) | Diam, $d_f$(mm) | Vol, $V_f$(mm³) | $d_f/d_o$ |
| 12.5 | 1.0 | 0.524 | 2.0 | 4.192 | 2.000 |
| 20 | 0.84 | 0.311 | 1.44 | 1.565 | 1.710 |
| 30 | 0.59 | 0.108 | 0.88 | 0.357 | 1.495 |

The present process enables the formation of styrenic coatings about seed styrenic beads, with the beads so produced comprised of 10–90 percent by weight of the initial styrenic seed beads and 90–10 percent by weight of the coating formed from the styrenic monomer used. The styrenic monomer may, of course, contain various additives such as plasticizers, lubricants, flame retardants or other additives.

The present invention is further illustrated in the following examples.

EXAMPLE I

To a 2-liter stirred resin kettle equipped with two combination thermowell-baffles (one containing a thermometer, the other a thermistor probe to regulate the temperature), an air reflux condenser, and a monomer addition tube, there was added 500 gms water, containing 0.0015% sodium dodecylbenzene sulfonate (Ultrawet K), 1.5 gms tricalcium phosphate and 500 gms of 285,000 wt. avg. molecular weight polystyrene beads [size passing through a 16 and held on a 30 mesh U.S. standard sieve, and having a distribution index (DI) value, defined as standard deviation (mm.) divided by medium bead size (mm.), of 15.2%] to form a slurry.

An emulsion of styrene monomer in water was formed by mixing 500 gms styrene containing 0.20% benzoyl peroxide and 0.05% t-butyl perbenzoate with 500 gms of water containing 0.5% of a nonionic surfactant, a polyoxyethylene (100) ether of nonylphenol (Igepal CO-990). The emulsion was formed by mixing the styrene-catalyst solution and the water-surfactant solution through separate side arms of a mixing chamber containing a high speed mixer.

A continuous feed of each solution and a continuous overflow of the resulting emulsion from the mixing chamber was effected during a feed period of emulsion to the bead slurry at a rate of 1.4 mls/min (each stream) for 2 hours, then increasing the feed to 2.5 mls/min requiring about 4.5 hours to add the total charge of 500 gms styrene. Polymerization was effected by maintaining the bead slurry at 90° C., with an extra 5 hours at 90° C., after all monomer had been added.

The aqueous slurry was then acidified to a pH of about 1.0 to dissolve the phosphate and the resultant beads separated, washed with water and air dried. The product beads comprised beads of a diameter such that 83% of the beads passed through a 14 and were held on an 18 mesh U.S. standard sieve screen, and had a DI value of 11.4%, with no fine powdery polystyrene found and no clusters of beads formed. The process thus produced beads of a preferred larger size having a narrower size distribution, from styrene polymer beads of a smaller size, without production of fines or bead clusters.

EXAMPLE II

Two further batches of polystyrene beads, A and B, of a size of those used in Example I, were coated with a polystyrene coating to increase the size thereof according to the procedure of Example I, except that in the emulsion of batch B, the emulsifier used to emulsify the catalyzed styrene monomer was a polyoxyethylene (50) ether of nonylphenol. Both products were found to contain no fine polystyrene particles. The bead clusters formed in the product from batch A were found to amount to only 1.5% and these were mostly only twin bead clusters as opposed to larger masses. In the product from batch B, the bead clusters amounted to only 0.15% of the product. Both batches produced beads of a size such that 83% of the beads passed through a 14 and were retained on an 18 mesh U.S. Standard sieve.

Attempts to use octylphenol or nonylphenol condensates of substantially less than 50 moles of ethylene oxide per mole of alkylphenol resulted in the formation of a larger percentage, e.g. 10%, of bead clusters.

EXAMPLE III

A further example was carried out using the process of Example I, wherein the coating on the polystyrene beads was formed as a polystyrene coating having a lower molecular weight than the polystyrene of the said beads, by increasing the benzoyl peroxide catalyst content from 0.20% to 0.55%. The product comprised larger beads than the said beads, the larger beads having a coating of a polystyrene of a lower molecular weight than that of the seed beads.

We claim:

1. A process for forming styrenic polymer beads having a preferred diameter bead size from styrenic polymer beads of a lesser diameter bead size comprising:
   (a) forming a suspension of said styrenic polymer beads of a lesser diameter bead size in an aqueous medium with the aid of a finely divided, difficultly water-soluble, inorganic phosphate suspending agent and a modifier therefor,
   (b) forming an emulsion of styrenic monomer, containing a monomer-soluble free-radical-producing catalyst, in an aqueous medium containing a nonionic surfactant comprising an ethylene oxide condensate of an alkylphenol, selected from the group consisting of octylphenols and nonylphenols, said surfactant containing at least fifty moles of ethylene oxide per mole of alkylphenol, and
   (c) adding said styrenic emulsion continuously over a period of time to said styrenic polymer bead suspension and subjecting the mixture so formed to an elevated temperature to polymerize said styrenic monomer about said styrenic polymer beads.

2. The process as defined in claim 1 wherein said styrenic polymer beads are produced from a styrenic monomer selected from the group consisting of styrene, alphamethylstyrene, para-methylstyrene, para-t-butylstyrene, monochlorostyrene and dichlorostyrene.

3. The process as defined in claim 1 wherein said styrenic monomer is selected from the group consisting of styrene, alpha-methystyrene, para-methylstyrene, para-t-butylstyrene, monochlorostyrene and dichlorostyrene.

4. The process of claim 1 wherein said modifier is sodium dodecylbenzene sulfonate.

5. The process of claim 1 wherein said nonionic surfactant is selected from the condensates of nonylphenol and 50 to 100 moles of ethylene oxide.

6. The process of claim 1 wherein said nonionic surfactant is present in an amount of 0.1 to 1.0 weight percent based upon the weight percent of water in said emulsion.

7. The process as defined in claim 1 wherein said styrenic monomer, free radical catalyst, and nonionic surfactant are admixed with water to form said emulsion prior to addition thereof to the styrenic polymer bead suspension.

8. The process as defined in claim 1 wherein a first solution of free radical catalyst and monomer, and a second solution of nonionic surfactant and water, are formed, and wherein said first and second solutions are continuously mixed to form an emulsion just prior to addition of said emulsion to the styrenic polymer bead suspension.

9. The process as defined in claim 1 wherein the styrenic polymer beads, so produced, contain 10–90 percent of said initial styrenic polymer beads and a coating thereabout formed from the polymerized styrenic monomer comprises 90–10 percent of the beads produced, both percentages based upon the weight of the beads produced.

10. A process for forming styrene polymer beads having a preferred diameter bead size from styrene polymer beads of a lesser diameter bead size comprising:
    (a) forming a suspension of said styrene polymer beads of a lesser diameter bead size in an aqueous medium with the aid of a finely divided, difficultly water-soluble, inorganic, phosphate suspending agent and a modifier therefor,
    (b) forming an emulsion of styrene monomer, containing a monomer-soluble free-radical-producing catalyst, in an aqueous medium containing a nonionic surfactant comprising an ethylene oxide condensate of an alkylphenol, selected from the group consisting of octylphenols and nonylphenols, said surfactant containing at least fifty moles of ethylene oxide per mole of alkylphenol, and
    (c) adding said styrene emulsion continuously over a period of time to said styrene polymer bead suspension and subjecting the mixture so formed to an elevated temperature to polymerize said styrene monomer about said styrene polymer beads.

11. The process as defined in claim 10 wherein the styrene polymer beads, so produced, contain 10–90 percent of said initial polystyrene beads and a coating thereabout formed from the polymerized styrene monomer comprises 90–10 percent of the beads produced, both percentages based upon the weight of the beads produced.

* * * * *